United States Patent
Kortenbach

(10) Patent No.: US 6,627,817 B1
(45) Date of Patent: Sep. 30, 2003

(54) PROCESS AND DEVICE FOR HOLDING AND THREADING ELONGATE OBJECTS

(75) Inventor: Martinus Kortenbach, Augustin (DE)

(73) Assignee: DSG-Canusa GmbH & Co. KG (DE)

( * ) Notice: Subject to any disclaimer, the term of this patent is extended or adjusted under 35 U.S.C. 154(b) by 0 days.

(21) Appl. No.: 09/581,351

(22) PCT Filed: Jun. 26, 1998

(86) PCT No.: PCT/EP98/03928

§ 371 (c)(1),
(2), (4) Date: Nov. 2, 2000

(87) PCT Pub. No.: WO99/30398

PCT Pub. Date: Jun. 17, 1999

(30) Foreign Application Priority Data

Dec. 9, 1997 (DE) .................................... 297 21 749 U
Feb. 18, 1998 (DE) .................................... 298 02 818 U

(51) Int. Cl.[7] ........................... H02G 15/02; H02G 3/18
(52) U.S. Cl. ................................ 174/74 R; 174/65 G
(58) Field of Search ........................... 174/74 R, 75 F, 174/77 R, 84 R, 94 R, 89, 92, 656, 152 G, 153 G, 151; 439/556, 559; 248/56; 16/2.1, 2.2

(56) References Cited

U.S. PATENT DOCUMENTS

| | | | | |
|---|---|---|---|---|
| 4,719,316 A | * | 1/1988 | Hoffman et al. | 174/88 R |
| 4,840,194 A | * | 6/1989 | Berry | 138/155 |
| 4,912,287 A | * | 3/1990 | Ono et al. | 174/153 G |
| 4,933,512 A | * | 6/1990 | Nimiya et al. | 174/92 |
| 5,266,742 A | * | 11/1993 | Heier et al. | 174/93 |
| 5,313,018 A | * | 5/1994 | Meltsch et al. | 174/155 |
| 5,342,315 A | * | 8/1994 | Rowe et al. | 604/167 |
| 5,426,715 A | * | 6/1995 | Moisson et al. | 156/158 |
| 5,545,854 A | * | 8/1996 | Ishida | 16/2.2 |
| 5,639,993 A | * | 6/1997 | Ideno et al. | 174/153 G |
| 5,792,991 A | * | 8/1998 | Nolf | 174/92 |
| 6,064,003 A | * | 5/2000 | Moore et al. | 16/2.1 |

FOREIGN PATENT DOCUMENTS

| | | | | |
|---|---|---|---|---|
| DE | 0403937 | * | 6/1989 | H02G/15/013 |
| FR | 2 645 683 | * | 4/1989 | H02G/15/113 |
| JP | 7-272540 A | * | 10/1995 | H01B/7/00 |

* cited by examiner

Primary Examiner—William H. Mayo, III
(74) Attorney, Agent, or Firm—Fredrikson & Byron, P.A.

(57) ABSTRACT

A dividable and sealable grommet and a method of holding and guiding elongated objects with the aid of the grommet are provided. The grommet includes a press section and a connecting section, each section further being formed of two halves, the two sections being interconnectable in fluid-tight fashion via parting surfaces. The connecting section includes a stiffening portion consisting of a solid, rigid material which is surrounded by a flexible or semiflexible material. The parting surfaces of the two halves of the connecting section may be interconnected in a dimensionally stable (torsionally rigid) manner and in fluid-tight fashion. The outer circumference of the connecting section may be sealingly connected to a wall opening. In the inventive method, one half of the divided grommet is occupied by a wire bundle, whereupon the other half of the divided grommet is connected to the first half of the divided grommet. In the area of the connecting section, the two halves are connected in a dimensionally stable, or torsionally rigid, and fluid-tight manner.

20 Claims, 14 Drawing Sheets

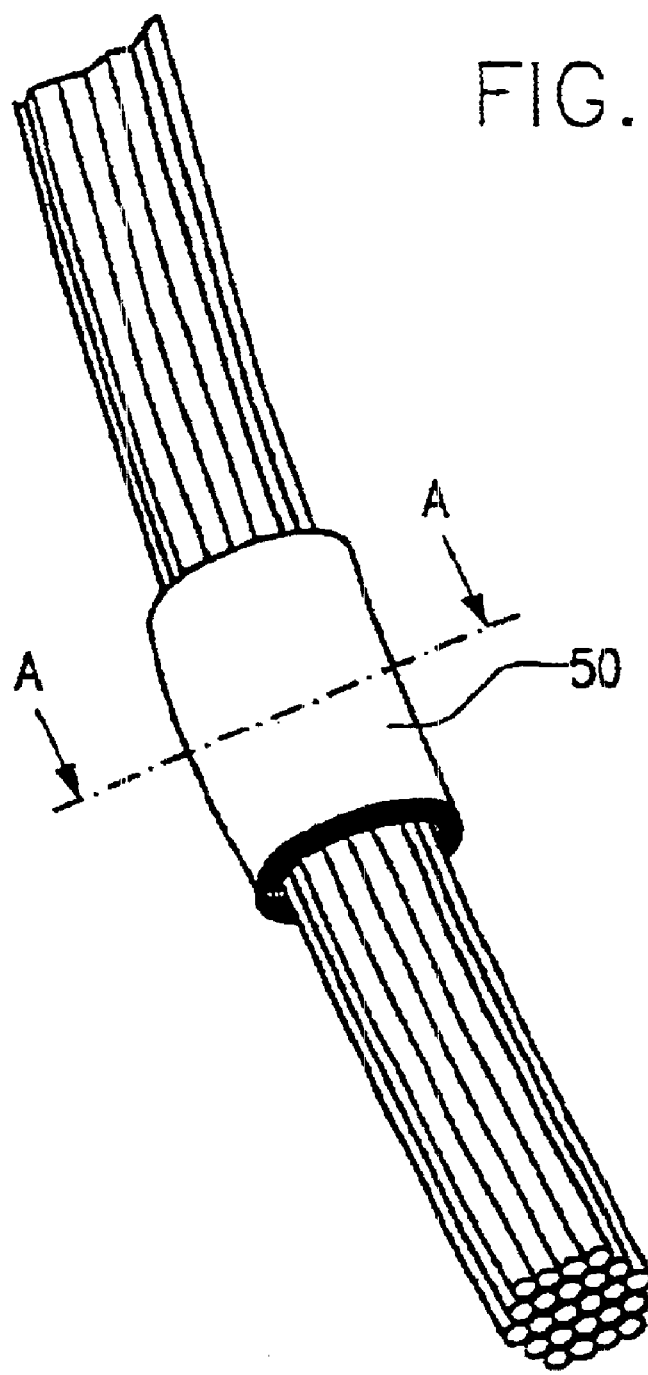

PROCESS AND DEVICE FOR HOLDING AND THREADING ELONGATE OBJECTS

BACKGROUND OF THE INVENTION

1. Field of the Invention

The present invention relates to a device and a method for holding and guiding elongated objects, for example, multiple wire bundles, multiple sheathed wires, multiple flat ribbon or flat cable bundles. In particular, the present invention relates to a device and method for holding and guiding wire bundles that are used in automobiles.

2. Background of the Invention

Wire bundles, or wire harnesses, are used in automobiles to form electrical connections between a battery and various electric components. Frequently, such harnesses have been used to connect parts located in the engine compartment of a motor vehicle with parts that are located in a passenger compartment of the motor vehicle. In order for the harnesses to extend between the engine compartment and the passenger compartment, the harnesses typically pass through a perforation formed in a partition between the engine compartment and the passenger compartment. Standardly, the engine compartment of a motor vehicle is open to the road surface and, therefore, moisture from the road surface may reach the outer surfaces of the wire harness or the individual wires forming the wire harness. This moisture, for example, drops of water, tends to migrate on insulated surfaces of the individual wire or on the surface of the entire wire harness. If the water droplets migrate to a portion on the wires that is not insulated, typically the ends of the wires, there is a likelihood that the vehicle's electric system will be compromised.

A device for holding and guiding elongated objects, such as multiple wire bundles, is disclosed in DE 196 40 816 A1. The DE 196 40 816 A1 device is divided along a center plane and comprises two arcuate press elements, which during use, are brought into engagement in ring-like fashion around the elongated object, e.g., wire bundle or the like. With the aid of suitable fastening devices, the two arcuate press elements may be interconnected and apply the desired contact pressure to the elongated object, which is surrounded by the elements.

Because this known device from DE 196 40 816 A1 is bipartite, wire bundles or multiple wire bundles may be produced in an automatic manner. In the initial industrial production of multiple wire bundles, e.g., when cable harnesses were first introduced in automobile applications, wire bundles were made by hand on so-called shaping boards. The individual wires of a multiple wire bundle needed to be hand threaded through annularly closed or ring like structures, such as rubber sleeves or boots, heat-shrinkable tubes, insulating tubes, or the like. The DE 196 40 816 A1 device obviates the need for hand-threading.

DE 196 40 816 A1 also discloses sheathing the outer circumferences of each of the two parts of the dividable devices with a soft rubber sleeve, so that the device may be used as a wall passage, with the outer edge of the rubber sleeve being brought into sealing engagement with the inner circumference of an opening extending through the wall. The parting surfaces of the rubber sleeve are not as dimensionally stable as opposed to material-saving types, with the effect being that upon the introduction of outer forces, a local opening is likely to be presented in the area of the parting surfaces. In turn, this local opening jeopardizes the required fluid tightness in the area of the parting surfaces.

DE 196 40 816 A1 further teaches that the passage of liquids and gases through the wire spaces or gores is effectively prevented in the area of the bipartite device with the help of butyl. For the purpose of simplicity, this phenomenon, referred to as "water tightness in the longitudinal direction", and occurs because the individual wires are glued in parallel with one another onto a butyl layer of an adhesive tape. In addition, the individual wires connected to the adhesive type are arranged layerwise in a part of the divided device, so that the individual wires are sandwiched between butyl layers. The passage opening, which is formed between the two arcuate press elements, is undersized with respect to the wire system provided with the butyl adhesive. Therefore, a uniform pressure is exerted on the wire bundles when the two press elements are joined; likewise, the wire bundles in their entirety are firmly pressed against the inner wall of the passage opening. This arrangement purports to prevent liquids and/or gases from passing between the individual wires and from passing between the outer circumference of the wire bundles and the inner surface of the bipartite device.

Thus, conventionally, water tightness or water blocking is achieved by providing a sealing compound or sheath around an individual wire or, in the case of a wire harness, around each individual wire and around the outer surface of the wire harness. Additionally, external pressure is exerted on the surface of the sheathed area of the wire or wire bundle such that no voids are left open between individual wires and between externally located wires and the surrounding sheath, the sheath preferably being a heat shrinkable hose which, under the influence of heat, tightly shrinks about an individual cable or a cable bundle at a desired position. The sheath acts as a moisture block where provided along with the outer shirking hose permanently exposing an inwardly directed force onto the sheath, thereby achieving the desired water tightness.

If a wire harness provided as described above is positioned, for example, in a partition between the engine compartment and th passenger compartment of a motor vehicle such that the treated portion of the wire harness is located within a hole provided in the partition, water migration is prevented. Specifically, water, and other fluids, that may enter the engine compartment and migrate on the insulation coating of individual wires or of the wires forming the wire harness, maynot migrate beyond the fluid blocking sealing compounds and maynot enter the passenger compartment. Thus, fluid maynot reach the non-insulated exposed ends of the wires which provide electric connection to various components.

SUMMARY OF THE INVENTION

The present invention provides an improved divided device for holding, guiding, and, leading elongated objects, for example, multiple wire bundles, there through. In particular, the present invention provides a grommet comprised of two half shells, each half shell being comprised of a press element and a connecting section element.

The grommet of the present invention comprises two interlocking half shells, each of which contains a press element and a connecting element. By interlocking the two half shells, elongated objects such as multiple wire bundles or the like may be retained in a desired position in a fluid-tight fashion. The grommet may be used for electrical wires, as well as for media-carrying conduits, whereby, the conduits may be guided, held, and led as well. Media-carrying conduits are, for instance, thin hollow bodies which carry liquids, e.g., washing liquids, cooling liquids or braking liquids, to their place of use.

The grommet is comprised of at lea,t one press element and at least one connecting section element that is linked to the press element in the direction of extension of the elongated objects. The sealing and dimensionally stable parting surfaces of the grommet allow it to replace ring-like or tubular soft rubber boots, which had been used previously in the art to hold or guide cable bundles and are produced by hand in a time-consuming manner.

In a preferred embodiment of the invention, the sealing and dimensional stability in the parting surfaces of the connecting section are ensured by the connection section consisting of an elastic material, such as EPDM or TPE, on its exterior, and a stiffening insert, such as PA, in its interior. Because of its structure, the connecting section is dimensionally stable so as to withstand external forces encountered during operation and allow no leakage in the area of the parting surfaces of the two connecting section parts, e.g., halves. The elastic material of the exterior of the connecting section also provides a fluid tight connection of the outer circumference of the grommet to the edge portion of wall openings, and is commonly found in sleeves or grommets, e.g., draw-in, press-in or push-in grommets.

A stiffening insert or "skeleton" located in the interior of at least the connecting section may also be provided consisting of an elastic flexible material. The stiffening insert or "skeleton", consisting of a rigid, plastic material, such as PA, located in the interior of the connecting section of the bipartite grommet, is a precondition for the technically useful dividing and sealing functions of the grommet. The two halves of the grommet may be separated lengthwise and rejoined in a reliable and sealing manner. This contrasts with the prior art where separation of the halves would results in leaky areas on the parting surfaces upon the application of external forces.

The two half shells (or halves) are not in contact with one another at the time when a wire bundle is inserted. Following the insertion of the wire bundle, the two halves, which each comprise a press element surrounding the wire bundle and a connecting section element following the press element in longitudinal direction, are joined in the area of their parting planes. The parting planes are joined by screwing, locking, damping or in any other suitable manner. The wire bundle is fixed in the grommet according to the invention by exerting pressure on the wire bundle after the two halves have been joined. Possible methods for achieving the necessary pressure exertion include: (1) slightly over-dimensioning the wire bundle diameter relative to the fixed diameter of the passage channel formed between the joined press elements, (2) increasing the diameter of the wire bundle by sheathing the same with a suitable material; (3) inserting a rubber-like lining on the inner surfaces of the passage channel halves of the two press elements, thereby reducing the fixed diameter of the passage channel in pressure-exerting fashion; and (4) providing a flexible or semi-flexible, rubber-like material in the passage channel of the press elements, possibly provided for in only one of the two press elements of the grommet, with the material reducing the fixed diameter of the passage channel.

As to the sealing function of the grommet, a distinction should be made between "water tightness in the longitudinal direction" and "fluid-tight sealing". "Water tightness in the longitudinal direction" or longitudinal waterproof sealing, is meant to include liquids or gases being prevented from creeping through the grommet along the surfaces of the individual wires of the cable or wire bundle or along their insulating sleeves. Hence, within the scope of the present invention, "water tightness in the longitudinal direction" designates the ability of the grommet to effectively prevent fluids from axially passing from one side of the grommet to the other side of the grommet. In contrast, within the scope of the present invention, the term "fluid-tight sealing" does not regard conditions prevailing inside the wire bundle, but conditions existing outside the wire bundle; in particular, sealing the outer circumference of the connecting section element so that the grommet may be secured in a wall opening.

In the grommet according to the invention, water tightness in the longitudinal direction may be achieved through the use of a butyl sealing compound, as described in DE 44 41 513 A1, or any other suitable sealing compound, e.g. a pressable gel, a grease, or a suitable sealing and adhesive compound. This sealing compound is provided between the individual wires of the wire bundle or between their insulating sleeves, on areas where pressure is exerted following the joining of the two grommet halves. A resulting constant pressure on the sealing compound is achieved with the invention, preferably by also doing one of the following alternatives: (1) providing a rubber-like lining on the press elements, at least in the area of their passage channels, or (2) providing a flexible or semi-flexible, rubber-like plastic material in the press elements, at least in the area of the passage channels, possibly provided for in only one of the two press elements of the grommet.

The diameter of a wire bundle will be increased when a sealing compound is positioned between the individual wires of the wire bundle or between the insulating sleeves of these individual wires. A wire bundle having such an over-dimension may be fixed in a correct position in the press elements when one press element is provided with two guide tongues that cooperate with receiving grooves formed in the opposite press element. The tongue and groove configurations ensure that the two grommet halves are joined centrally.

The above-mentioned guide tongues serve not only to position and center an overdimensioned wire bundle, but also serve as 'level indicators" for ensuring that a sufficiently high pressure is exerted on the sealing compound. To this end, a wire bundle whose diameter is oversized because of the sealing compound contained in t he wire bundle is checked a s to whether the diameter of the wire bundle corresponds to the height of the upper edge of the guide tongues. In case the wire bundle diameter does not reach the upper edges of the guide tongues, the wire bundle diameter may be stuffed with fillers until the stuffed wire bundle diameter reaches the upper edges of the guide tongues.

It follows from the above discussion that the dividable grommet of the invention is fluid-tight in all of its parting surfaces and also in its connecting portions with a wall opening. According to a preferred embodiment, water tightness in the longitudinal direction may be achieved by using a sealing compound, possibly in the form of an adhesive tape. Furthermore, the area formed by the press elements may not only be straight, but also bent or curved, or of any other desired design.

The grommet according to the invention provides many economic advantages. As a result of its dividing function, the conventional time-consuming and cost-intensive hand threading operation may be dispensed with. This, in turn, creates conditions under which simple and complicated wire bundles, such as cable harnesses for cars, may be produced in an automatic manner. Furthermore, according to the invention, water tightness in the longitudinal direction need no longer be created in a separate operation. Moreover, the dividable grommet according to the invention may be repaired and maintained easily if and when faults are to be located. The two halves of the grommet may be easily separated from one another and the interior of the grommet maybe inspected. The grommet, which is divided according to the invention and which permits a subsequent opening operation makes it possible to introduce additional electrical wires at a later time, and also to remove an originally provided electrical wire without impairing the grommet as a whole, its fluid tightness or its water tightness in the longitudinal direction.

The lengthwise water-tight variant of the dividable grommet according to the invention may replace the non-dividable rubber sleeves or boots, together with heat shrinkable tube and sealing components consisting of hot-melt type adhesives and the like, which have so far been used for the purpose of achieving water tightness in the longitudinal direction. As a consequence, the expensive threading of wire bundles, i.e., through the use of conventional rubber sleeve and the conventional shrinkable tube, may be dispensed with.

The technical progress made with the present inventive method stems not only from being able to provide precise positioning and fixation for an elongated object, such as a wire bundle, but also from being able to guarantee that the two half shells of the grommet are connected in a fluid-tight and dimensionally stable, or torsionally rigid, manner. Advantageous developments of the invention permit the exertion of a constant pressure on the elongated object, e.g., wire bundle. The constant pressure being exerted on the elongated object may be provided in the following ways: (1) slightly over-dimensioning the elongated object, (2) stuffing the elongated object, (3) providing a rubber-like inner lining in the two press elements to be used, or (4) producing the press elements with a flexible or semiflexible, rubber-like plastic material in the area of the passage channel.

The method of the invention may also be implemented such that a sealing compound is introduced between the individual wires or the individual wire insulations of a wire bundle. When this sealing compound, preferably butyl rubber, is acted upon by the above-mentioned pressure, the wire bundle is sealingly protected against the passage of liquids or gases, with the effect being that liquids or gases maynot pass from one side of the bipartite grommet to the other side. The bipartite rubber grommet to be used in the method of the invention is dimensionally stable, i.e. torsionally rigid, at least in the area of its parting or connection surfaces. Furthermore, in a preferred embodiment of the method according to the invention, use is made of a diameter of the elongated object, e.g., wire bundle, to ensure a constant pressure. The biparte grommet is equipped with suitable level indicators, or guide tongues, useful for this purpose.

DESCRIPTION OF THE DRAWINGS

FIG. 8A is a perspective view of multiple wire bundles with a partial winding provided over a predetermined length of the wire bundles;

DESCRIPTION OF THE PREFERRED EMBODIMENTS

The present invention is directed towards a grommet for holding, guiding, and leading elongated objects there-through. It may be particularly useful for guiding wire bundles from an engine compartment of an automobile to a passenger compartment of the automobile. The invention is described with reference to FIGS. 1 through 19, like elements being assigned the same element number throughout. The Figures are meant to be illustrative of example embodiments of the invention and in no way limiting.

In general, each of the embodiments of the grommet according to the invention comprises a press section, which is engageable with a wire bundle or other elongated structure, and a connecting section, which has an outer circumference that is connectable, at least in part, to a wall, and which adjoins the press section in the longitudinal, or axial direction. The grommet is preferably split or divided along a central plane, so that each grommet consists of two interconnectable halves (or half shells), of which each comprises a part, e.g., a half, of the press section and a part, e.g., a half, of the connecting section. In the illustrated embodiments, the planes of division of the press section and the adjoining connecting section always extend in the same plane. However, the plane of division of the connecting section may have an orientation differing from that of the plane of division of the press section.

The surface of the passage channel formed in the press section may be hard and smooth, and consist of PA. Alternatively, however, the surface of the passage channel may have an additional coating, preferably of a soft, elastic material, such as EPDM or TPE. The surface coated in this manner is either smooth or rib-shaped, as shall be described in more detail in the following text.

The connecting section which serves to sealingly connect the press section of the grommet of the invention to a wall, and in particular, a wall opening, is dimensionally stable, o)r torsionally rigid, and has a sealing effect, at least in the area of its parting or connecting surfaces.

A special advantage of the grommet of the invention follows from the fact that the connecting section is made of an elastic material, such as EPDM or TPE, and of a reinforcing material, such as PA. Because of such a combination of materials, a torsion-free and sealing grommet is obtained, which is due in particular to reinforcement in the connecting section element, illustrated in FIG. 3.

In the following description, the terms "part" and "half" will be used as synonyms for the two half shells which the inventively divided grommet is composed of. However, the two parts of a device according to the invention need not have the same size, because, for example, an angular separating cut through the device is also possible in principle, whereby a first larger section and a second smaller section would be obtained.

Figure 1A:
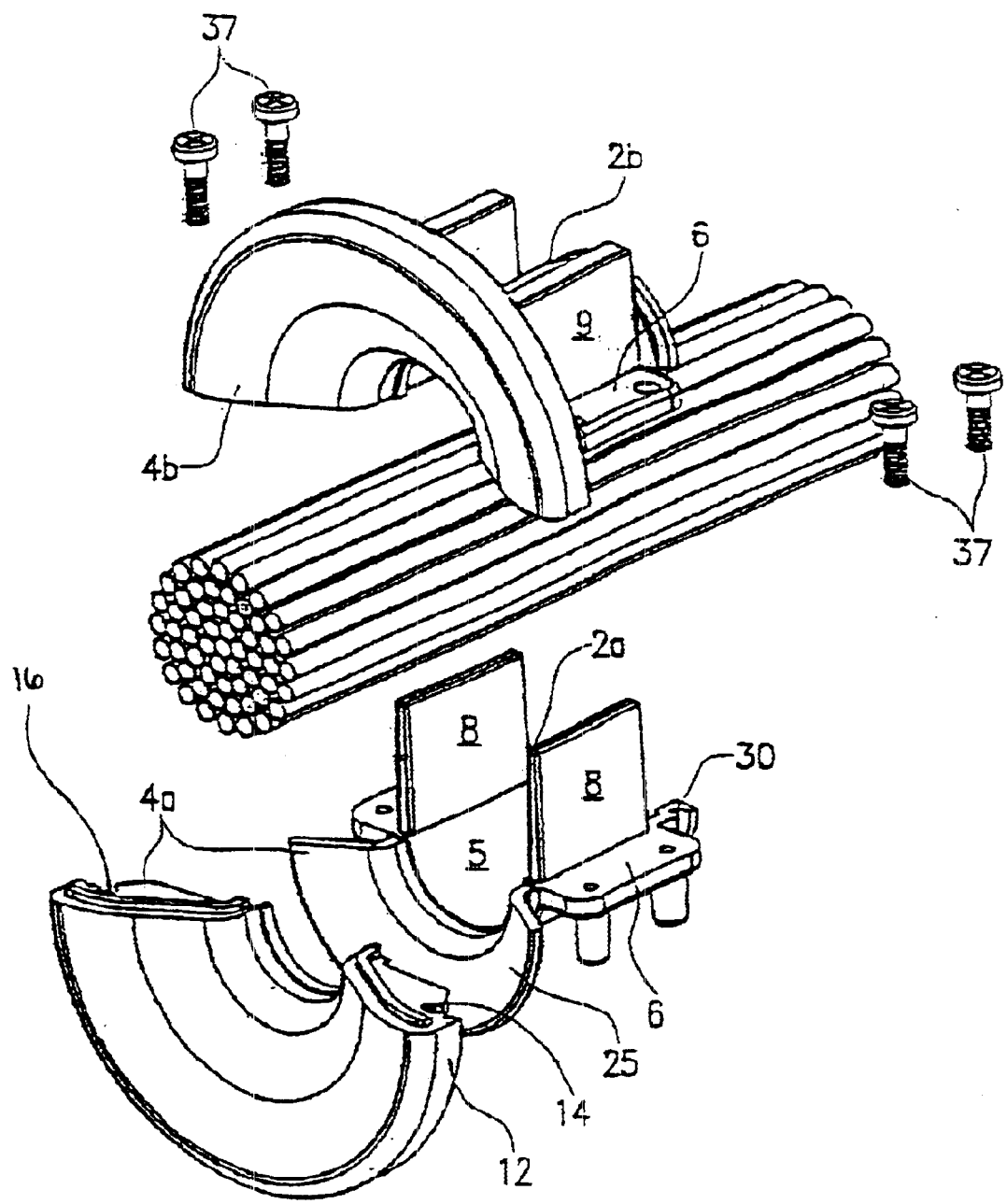
FIG. 1A is a perspective view of a grommet illustrating how a wire bundle is arranged between upper and lower half shells.

FIG. 1A is illustrates one embodiment of a divided grommet in accordance with the present invention. The grommet consists of two halves (half shells), namely a lower one and an upper one. Each half shell has a press element, 2a and 2b, and a connecting section element, 4a and 4b, which adjoins the corresponding press element 2a and 2b respectively, in longitudinal direction. When the two half shells are interconnected (FIG. 4), they form an elongated passage channel 5 and a funnel-shaped connecting section 4, which adjoins elongated passage channel 5 in the longitudinal direction. A wire bundle, e.g., a section of a cable harness, may safely be received between the two half shells of the grommet, with a sufficiently great pressure being exerted in the area of the press elements 2a and 2b on the wire bundle to fix the same safely. The outer circumference of the dimensionally stable funnel-shaped connecting section 4, which has a sealing effect, may be brought into sealing engagement with the edge portion of a passage opening in a wall (not shown). The funnel-shaped connecting section 4 consists of two different materials. Next to the press elements 2a and 2b, the connecting section 4 is made of a rigid plastic material, such as PA. This rigid plastic material is surrounded by a non-rigid flexible material, such as EPDM or TPE. A locking edge 12 and a sealing lip 14 are formed on the outer circumference of the non-rigid, flexible part. A tongue, 16, and groove, 18, are also formed on the parting surfaces of the connecting sections 4a and 4b respectively. Guide tongues 8 and receiving grooves 9 that correspond with the guide tongues 8 are also shown.

In their operative position, the two half shells are connected to one another in fixed, but if necessary, releasable fashion, with the wire bundle being received between the two half shells in fixed and reliable fashion.

Within the scope of the present invention, the expression "parting surfaces" means all of those surfaces that are arranged in the plane or planes of division of the grommet of the invention. To be more specific, "parting surfaces" are always those surfaces with which the two half shells are in touching contact in the interconnected state. In the area of the press section, the parting surfaces consist preferably of a rigid plastic material, such as PA, optionally coated with rubber-like materials, such as EPDM, TPE, or an adhesive. In the area of the connecting section however, the parting surfaces consist of the above-mentioned non-rigid materials, i.e., EPDM or TPE. Also, the parting surfaces of the connecting section comprise a tongue-and-groove system so that the two parts of the connecting section may be interconnected in a dimensionally stable and sealing manner.

Figure 1B:
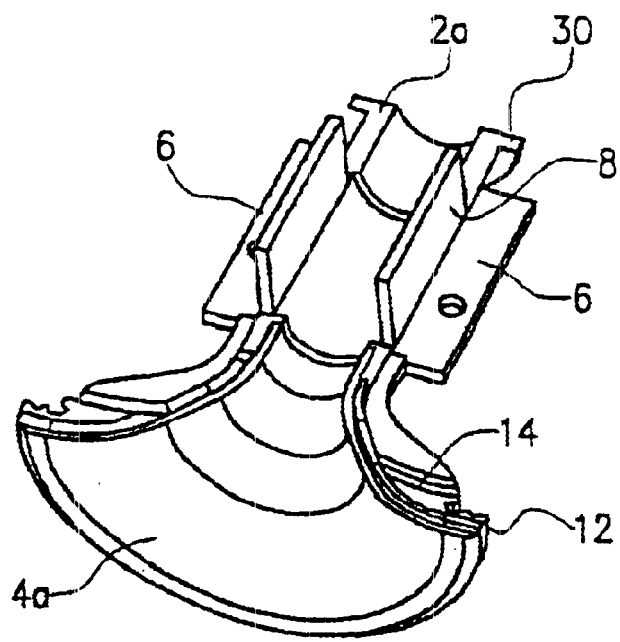
FIG. 1B is a perspective view of the lower grommet half of FIG. 1A, illustrating the press element and the connecting section element which adjoins said press element.

FIG. 1B shows a lower half shell of the embodiment of the inventive grommet from FIG. 1A, comprising a press element 2a and a connecting section element 4a. The press element 2a is shaped in the form of a tubular element. Likewise, the upper press element 2b (FIG. 1A) is also formed as a tubular element, so that the two press elements form a complete tube with a passage channel 5 (FIG. 4) after having been joined. After a wire bundle has been inserted into the passage channel 5, the two grommet half shells are interconnected via opposite flange elements 6 which extend outwards in the parting plane of the press elements 2a and 2b. Consequently, after the grommet half shells have been joined, the two corresponding pairs of flange elements 6 come in contact with one another. The half shells are secured together through the use of holes provided in the flange elements 6, or are interconnected in a different way.

Each press element is provided with guide elements that facilitate engaging and joining operations. As illustrated in FIG. 1B, the press element 2a is provided with guide tongues 8, which are designed as an extension of the parting surface of the press element 2a. The upper press element 2b (FIG. 1A) is suitably formed with receiving grooves 9 into which the guide tongues 8 are inserted. Each press element 2a is provided with an end portion section having a smaller cross-section in order to additionally exert pressure on the cable bundle to be inserted, whereby the egress of butyl is to be counteracted. Furthermore, this end portion is provided with an undercut 30 which makes it possible to couple, for instance, flexible and slotted corrugated tubes for protecting the wire bundle.

Figure 2:
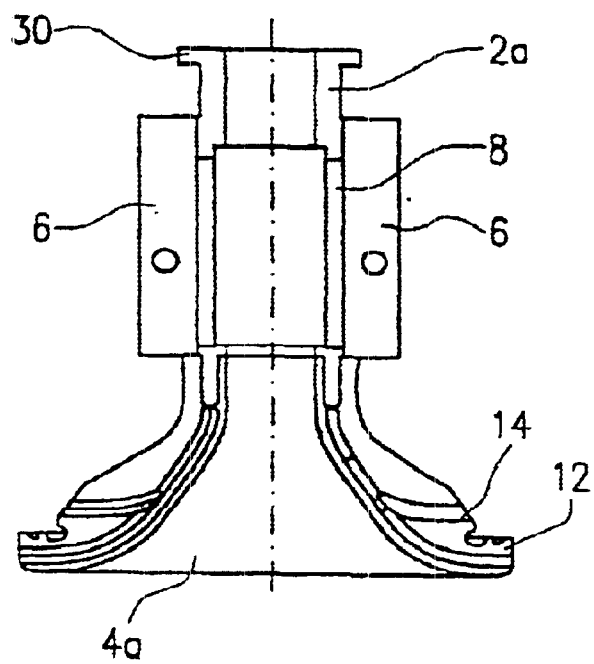
FIG. 2 is a top elevation view of the lower grommet half of FIG. 1B.

As illustrated in FIG. 2, each press element 2a is integrally provided at one end with a connecting section element 4a, which has the shape of a funnel half. The narrow funnel portion of the connecting section 4a is assigned to the press element 2a while the expanding funnel portion opens away from press element 2a. The connecting section element 4b (FIG. 1A) is formed on the upper press element 2b (FIG. 1A) in oppositely matching fashion, so that the two connecting section elements 4a and 4b form a complete funnel-shaped connecting section 4 (FIG. 4) when the two half shells are joined.

Preferably, the parting surfaces of the connecting section elements 4a and 4b are also formed with a tongue 16 and groove 18 (FIG. 1A) respectively, to ensure a fluid-tight connection of the two elements 4a and 4b, and to permit, at the same time, a more solid connection of the elements 4a and 4b. Furthermore, the parting surfaces may be coated with an adhesive to provide a particularly firm connection. Gels, greases, or the like, may be used to ensure that the connection is fluid-tight.

Figure 3:
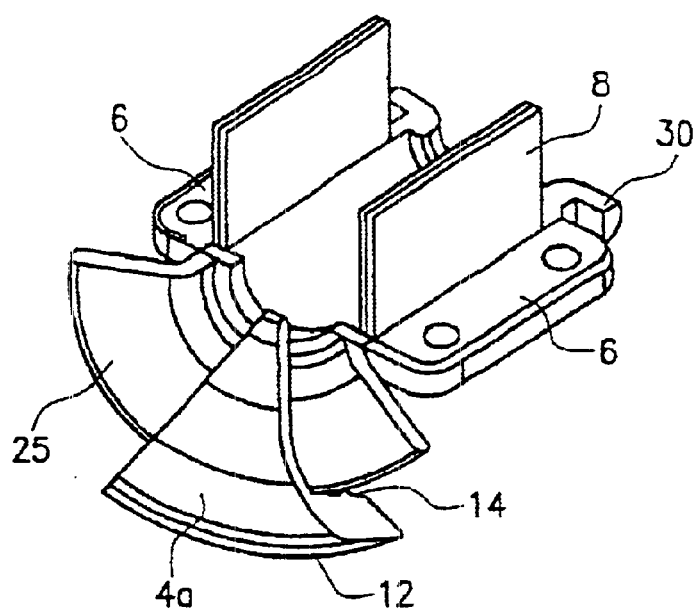
FIG. 3 is a schematic perspective view of the lower grommet half of FIG. 1B, with the connecting section element being partly cut away.

The structure of the funnel-shaped connecting section element 4a is shown in FIG. 3. In its interior, the connecting section element 4a has a reinforcing element 25. This reinforcing element 25 is made integrally with the press element 2a, which preferably consists of PA, and extends by a predetermined degree into the funnel-shaped structure of the connecting section element 4a. The reinforcing element 25 provides the necessary stiffness for the funnel-shaped connecting section element 4a in the narrow funnel portion, while the expanding outer funnel portion is made flexible and consists preferably of EPDM or TPE, so that the undercut provided there may be locked by applying a normal standard force. Such stiffness is a necessary precondition for achieving torsional rigidity in the parting plane, without which there would be no water tightness in the area of the parting plane.

According to FIG. 3, a locking edge 12, which cooperates with a sealing lip 14, is formed on the outside of the funnel-shaped connecting section element 4a. During use, the funnel-shaped connecting section 4 (FIG. 4) is inserted with its outer circumference into a corresponding wall opening, where the wall opening edge (not shown) is sealingly held between locking edge 12 and sealing lip 14.

Figure 4:
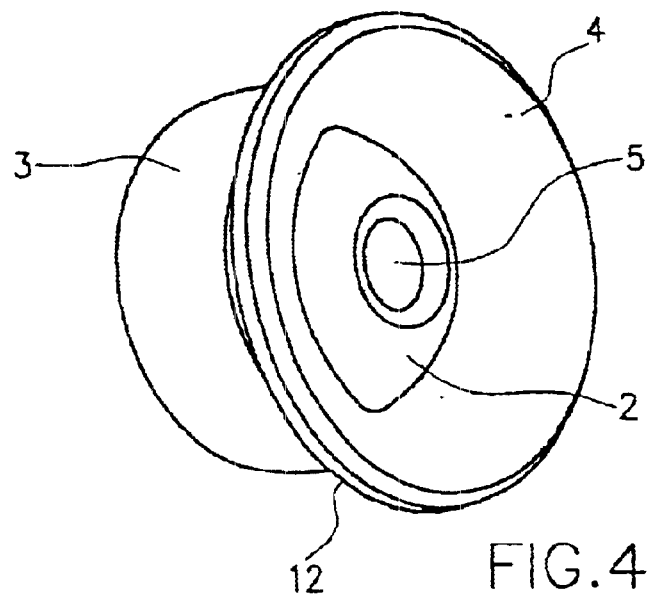
FIG. 4 is a perspective view of another embodiment of the grommet of FIG. 1A.

FIG. 4 shows a further embodiment of the grommet illustrated in FIG. 1A. The press section 2 is comprised of two press elements 2a and 2b (FIGS. 5A and 5B), semi-spherical elements which are joined on a parting surface (not shown) to form a ball. The press section 2 is supported in a shell 3, illustrated in FIGS. 6 and 7, which enables the ball to perform a rotational movement within the shell 3. Furthermore, the shell 3 is made integral with a funnel-shaped connecting section 4, with the expanding funnel portion widening away from shell 3.

Figure 5A:
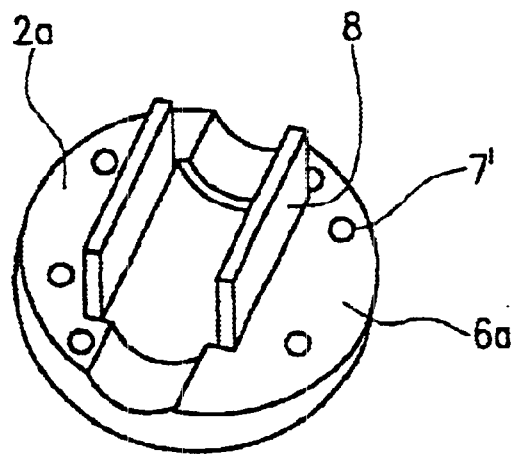
FIGS. 5A and 5B are perspective views of the two semispherically shaped press sections of the grommet of FIG. 4.
Figure 5B:
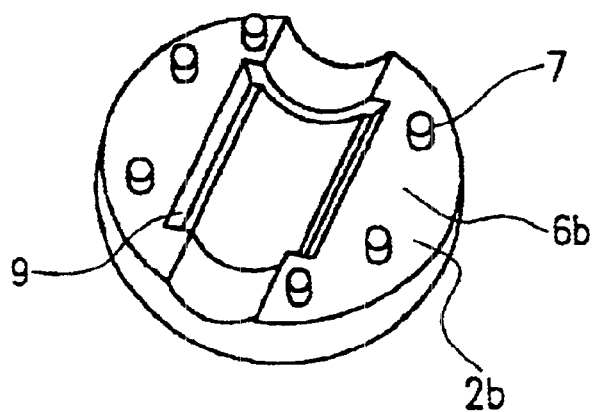
Figure 6:
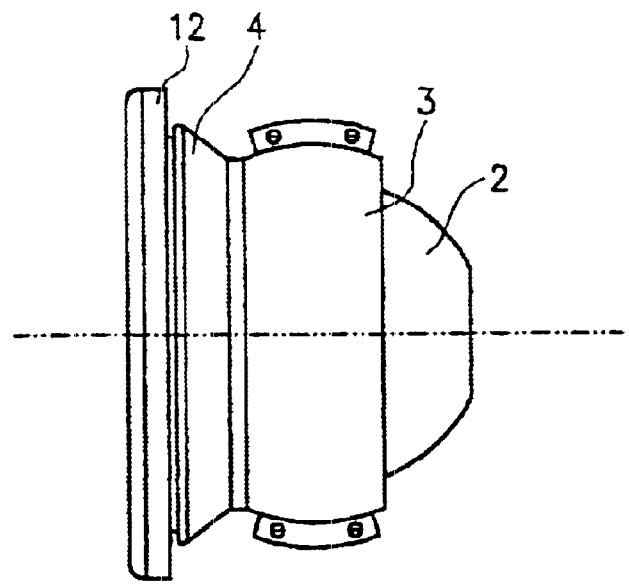
FIG. 6 is a top elevation view of the grommet of FIG. 4.
Figure 7:
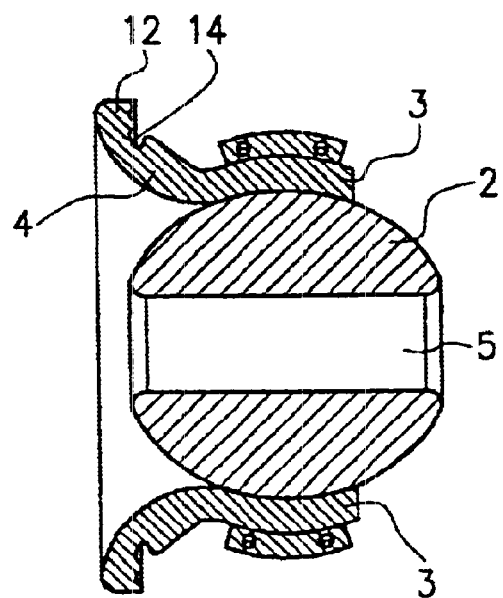
FIG. 7 is a bottom elevation view, in section of the grommet of FIG. 4.

The exact structure of the press elements 2a and 2b of the embodiment of FIGS. 4, 6 and 7, is apparent from FIGS. 5A and 5B. As shown, each of the press elements 2a and 2b is formed as a hemisphere, with the parting surfaces 6a and 6b being joined during use to form a ball. Each of the parting surfaces 6a and 6b of the semispheres has a recess 5a and 5b respectively, each of which is shaped in the manner of a groove, and which each extend over the whole surface up to the semi-round ball surfaces. During use, the two press elements 2a and 2b are interconnected such that these recesses 5a and 5b jointly form a passage channel 5, shown in FIG. 4, which is centrally arranged in the resulting ball.

To simplify the joining operation for the two press elements 2a and 2b in FIGS. 5A and 5B, there are provided centering elements on the parting surfaces 6a and 6b. As shown, one of the press elements 2b comprises projections 7b in the area of the parting surface 6b. As a consequence, the parting surface 6a is provided with recesses 7a which match the projections 7b in dimension and arrangement. During use, the projections 7b of the press element 2b engage the recesses 7a of the press element 2a, so that the two members virtually interlock. The press elements 2a and 2b are additionally provided with lateral guide elements which during use guide the wire bundle during the pressing operation. To this end, guide tongues 8 are formed on the parting surfaces 6a of the press element 2a to directly adjoin the two longitudinal sides of the groove 5a of the passage opening, with the guide tongues 8 extending in a direction approximately perpendicular to the parting surface 6a. The other press element 2b is equally provided on the parting surfaces 6b with receiving grooves 9 which directly adjoin the two longitudinal sides of the groove 5b of the passage opening, and which match the guide tongues 8 in shape and size. During use, the guide tongues 8 and receiving grooves 9 engage one another and guarantee—apart from an additional guidance of the wire bundle—that the two press elements 2a and 2b are locked.

After a wire bundle has been inserted and the two press elements 2a and 2b have been joined, the press elements 2a and 2b are screwed from the outside through drilled holes (not shown) which have been provided for. The two press elements 2a and 2b, however, may also be connected via adhesives, rivets or other positive connecting methods. The joined press elements 2a and 2b are subsequently received by two half shells which are formed on the narrower funnel portions and jointly form a spherical shell 3, illustrated in FIGS. 6 and 7. The dimensions of the outer spherical surface and the inner side of the half shell are chosen such that the press section 2 formed by the press elements 2a and 2b may move in the half shell. Each half shell is preferably designed such that only about half of the spherical surface is covered by the half shell so that the opening portions of the passage channel 5 of the ball are exposed. The two half shells are subsequently interconnected via a screw union or by rivets 13.

Each half shell is integrally formed with one half of a funnel-shaped connecting section 4, with the expanding funnel portion facing away from the half shell, illustrated in FIGS. 6 and 7. The outer expanding funnel portion of the connecting section 4 is provided with a locking edge 12, which extends around the whole outer circumference of the funnel. In direct vicinity of the locking edge 12, the outside of the funnel has formed thereon a projection, or sealing lip 14, which also extends over the whole circumference of the funnel. During use, the funnel is secured via the locking edge 12 and the neighboring sealing lip 14 in openings of thin walled brackets or wall plates. The locking edge 12 is arranged at the one side and the sealing lip 14 at the other side of the wall opening.

In all embodiments, the press elements 2a and 2b (FIG. 1A) are preferably made from PA. Likewise, the reinforcing element 25 (FIG. 3),,is preferably made of PA. The outer portion of the funnel is preferably made of EPDM or TPE, which is provided around the reinforcing element 25.

To put the device into operation, a wire bundle is first inserted into the passage opening of one of the press elements 2a or 2b (FIG. 1A), the wire bundle being over-sized with respect to the diameter of the passage opening. If water tightness in the longitudinal direction is desired, the wire bundle wires are embedded in adhesives. In particular, a plurality of individual wires or individual insulated wires are arranged on an adhesive tape in such a manner that the individual wires are sandwiched between individual layers of the adhesive tape. The active layers of this adhesive tape consist preferably of butyl.

Subsequently, the two press elements 2a and 2b (FIG. 1A) are combined, and pressure is exerted on the inserted cable bundle. If no butyl or the like is introduced between the individual wires, these wires are solely held and guided by the pressure exerted by the two press elements 2a and 2b. However, if a material, such as butyl, is provided between the wires and between the wires and the inner wall of the passage opening, water-tightness in the longitudinal direction is also achieved, so that no moisture may run along the individual wires. Such a seal, obtained with the aid of butyl or the like, is also gas-tight.

The bipartite connecting section, which adjoins the bipartite press section, allows for a fluid-tight guidance, for instance, of a cable bundle through a wall opening. As already described, the outer circumference of the funnel-shaped connecting section cooperates in fluid-tight fashion with the wall section surrounding the passage opening. Therefore, moisture is not able to propagate through the interior of the wire bundle as a result of the longitudinal water-tightness, and is not able to propagate through the wall opening as a consequence of the fluid-tight seal in the area of the outer circumference of the connecting section. As already mentioned, the two press elements of the press section are positively interconnected by a tongue-and-groove connection. Likewise, after the cable bundle or another elongated object has been inserted into the one half of the divided device and the other half is used to close the device, the two connecting section elements of the funnel-shaped connecting section are interconnected in a positive manner through a tongue-and-groove connection.

As for the embodiment shown in FIGS. 4 to 7, it should be noted that the press elements 2a and 2b, which are joined to form a ball, are movable in various directions inside the shell elements 3 holding the ball, so that in contrast to the embodiment according to FIGS. 1 to 3, the directional orientation of the passage channel 5 is variable.

As already mentioned, the device of the invention, i.e., the "grommet", which acts as a funnel-shaped body of insulating material for leading electrical lines through walls or for introducing the same into electric devices, has a dual function. On the one hand, the grommet ensures that the wall opening, which the cable or wire bundle passes through, is sealed. The outer edge of the funnel-shaped connecting section, which is made preferably of elastic material, allows for this sealed connection to take place. On the other hand, the circumferential surfaces which exert pressure on the cable bundle and pertain to the passage of the press section, which adjoin the connecting section in longitudinal direction, ensure that the cable bundle is retained in slip-proof fashion. If butyl or an equivalent material is provided between the individual wires, water tightness in the longitudinal direction is also achieved between the individual wires of the cable bundle and also between the outer surface of the cable bundle and the inner surface of the passage opening.

Experience shows, however, that sealing measures employing butyl or other suitable sealing compounds tend to lead to slight shrinkage in the course of time. Such a shrinkage will impair the seal of the cable bundle unless this shrinkage behavior is taken into account. With the help of the embodiment described in the following text, in particular with reference to FIGS. 9 to 11A, 12 to 14, and 16 to 18, the shrinkage of butyl or the like may be compensated for in a "self healing" manner.

FIG. 8A shows an elongated object in the form of a wire bundle section. This wire bundle consists of a plurality of wires which are each insulated with respect to one another with the help of a plastic material. A selected section of the wire bundle surface is provided with a sheathing 50 which, for instance, is guided around the wire bundle in the form of at least one winding to increase the cross-section thereof. It is thereby possible to increase the circumference of the wire bundle in a predetermined section of the wire bundle surface to a desired degree. Together with the embodiment of the grommet of the invention, which will be described in the following text in more detail, such an increase in diameter may be very expedient. For instance, when the outer circumference of the wire is not sufficiently great to be retained in the inventive grommet in anti-slip fashion, the diameter of the wire bundle may be increased by sheathing or forming a winding around a preselected section of the wire bundle. To the extent that the diameter of the sheathed wire bundle is undersized in comparison to the diameter of the passage channel of the grommet, the wire bundle may be sheathed so that it will be held with in the press section in anti-slip fashion. The wire bundle circumference may be increased by taking any suitable measures.

Figure 8B:
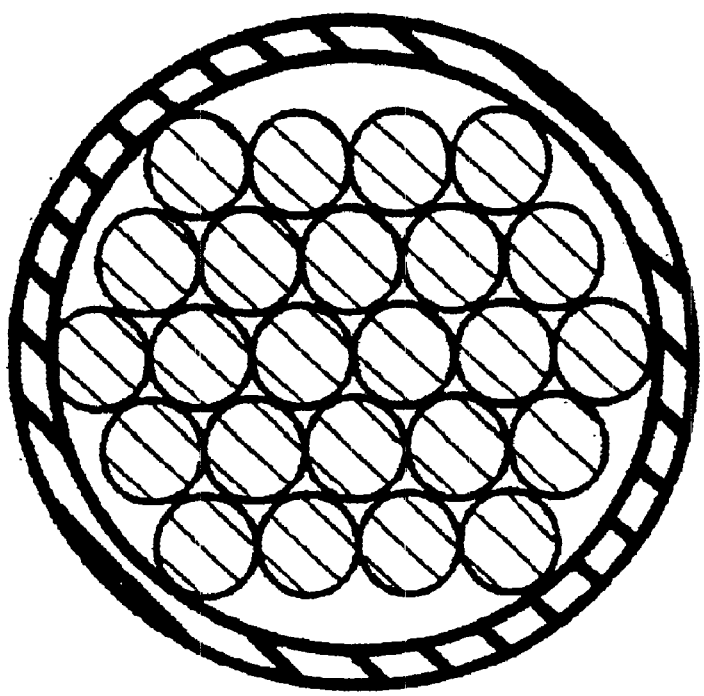
FIG. 8B is a cross-section view taken along line A—A in FIG. 8A.

FIG. 8B is a section taken along line A—A of FIG. 8A, which shows the resulting increase in circumference of the wire bundle as a consequence of adding sheathing 50. Since such a winding 50 has no influence on the spaces between adjacent wires of the wire bundle, water tightness in the longitudinal direction maynot be achieved in the area of the sheathing 50 just by taking the measures illustrated in FIGS. 8A and 8B.

In each of the embodiments of the grommet, the guide tongues, which are assigned to the press section elements, function primarily to guide the cable bundle once it is inserted into the grommet halves. When being suitably dimensioned, however, they may also serve as level indicators to monitor the desired diameter of the cable bundle to be inserted during assembly. If it becomes apparent during assembly that the cable bundle had a diameter that is too small, a filler member, as taught by DE 196 40 816 A1, could additionally be used for increasing the total diameter of the cable system in the area of the grommet to the desired degree.

The above-mentioned filler members serve to locally increase the wire bundle circumference in cases where the circumference of the original wire bundle is not sufficient to ensure the necessary contact pressure inside the grommet of the invention when the two grommet halves are being joined. These filler members preferably consist of an elastic flexible material, such as EPDM or TPE. Semiflexible plastic materials, such as PE and PVC, however, have turned out to be suitable for such a purpose as well. Moreover, it has been found to be advantageous for these fillers to be provided with a sheathing that preferably has a tacky, and thus, sealing effect. Butyl has turned out to be particularly suited for such a purpose. Such filler members which are sheathed with butyl should preferably be sandwiched between separating paper and cut to the desired size.

The use of guide tongues as level indicators ensures that the pressure required for obtaining perfect and permanent water tightness for a wire bundle in the longitudinal direction may be produced inside the grommet. The adhesive tape of butyl which is particularly preferred for achieving water tightness in the longitudinal direction is preferably processed within a temperature range of about 60° C.

In cases where water tightness in the longitudinal direction is not desired, the diameter may be increased with the aid of the sheathings 50 (FIG. 8A) and 50' (FIG. 11B) in cable bundles whose diameter is undersized.

Figure 9A:
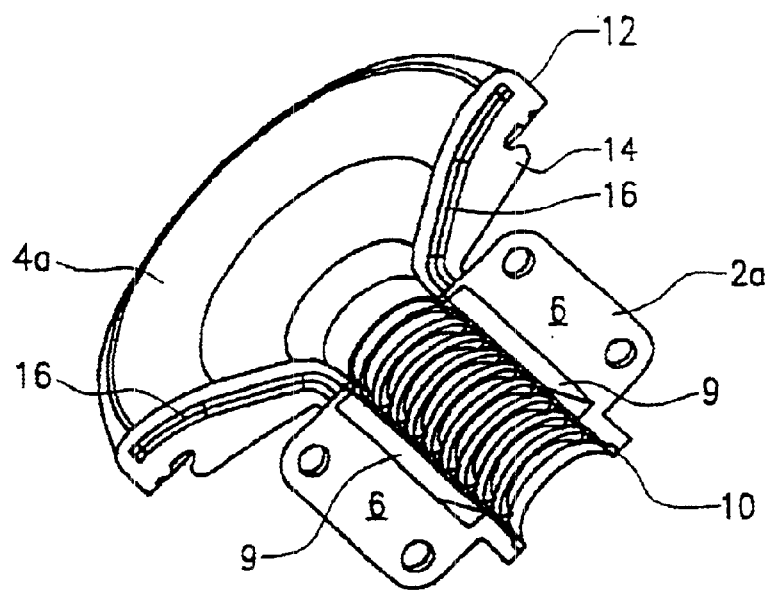
FIG. 9A is a perspective view showing the inner surface of an upper half of a preferred grommet.
Figure 9B:
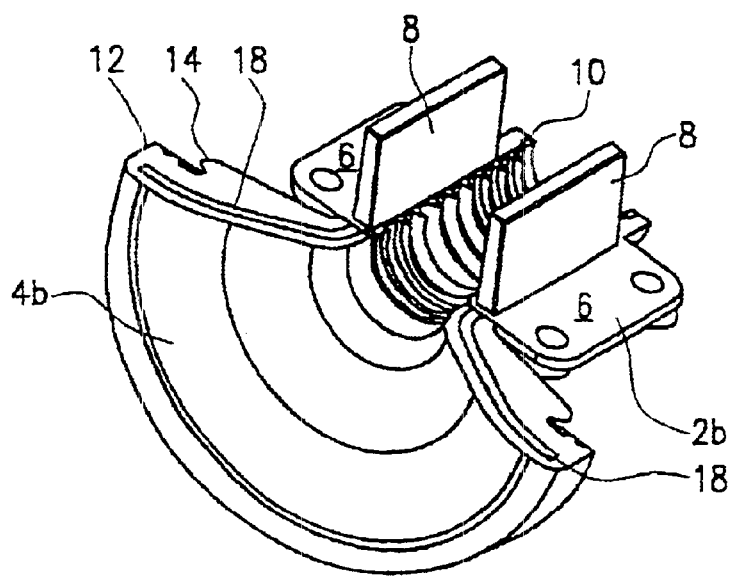
FIG. 9B is a perspective view showing the inner surface of a lower half of the preferred grommet.

FIGS. 9A and 9B are perspective views illustrating the two parts of a split grommet designed according to the invention. The upper half shell shown in FIG. 9A comprises an upper press element 2a and an adjoining connecting section element 4a. The lower half shell of the grommet, as shown in FIG. 9B, comprises a lower press element 2b adjoined by a connecting section element 4b, and a passage channel with rib-like projections 10 extending between a pair of guide tongues 8. The upper half shell shown in FIG. 9B comprises two receiving grooves 9 which are engaged by the guide tongues 8 when the shell halves shown in FIGS. 9A and 9B are joined. In the joined state, the curved sections, provided with the rib-like projections 10 in FIGS. 9A and 9B, form a passage channel for an elongated object, e.g., the wire bundle shown in FIG. 8A.

The rib-like projections 10 are arranged side by side in the press elements 2a and 2b. When the two grommet halves of FIGS. 9A and 9B are joined in the operative position, the rib-like projections extend into the passage channel to reduce the fixed diameter thereof. The rib-like projections 10 consist of a flexible material, such as rubber, silicone, or the like, and are advantageously formed in a layer (not shown) which is connected to the inner surface of the passage channel.

Each of the grommet halves shown in FIGS. 9A and 9B is provided with flange elements 6 which are opposite to each other in pairs. These flange elements 6 extend in the parting plane, along which the grommet is divided. Each of the flange elements 6 is provided with drilled holes, and with the use of such, the grommet halves shown in FIGS. 9A and 9B may be fixed in their operative position. In the operative position, a wire bundle is arranged in the passage channel formed by the two press elements 2a and 2b, and pressure is exerted on the wire bundle section, arranged in said passage channel, namely by exerting pressure on the flange elements 6.

Preferably, the rib-like projections 10 have a height of about 3 mm and are preferably spaced about 2 to 5 mm apart. Advantageously, the projections 10 have a wedge shaped cross-sectional design, with their broad ends being secured to their associated press element 2a or 2b. With this, the projections 10 are oriented with their tips facing the interior of the passage channel formed by the two parts of the inventive grommet to slightly reduce the fixed diameter of the channel.

These rib-like projections 10 have a dual function. First, they ensure that the wire bundle formed by the wires is retained in antislip fashion, even in cases where the diameter of the wire bundle becomes smaller as a consequence of a shrinkage process in the course of time. Second, in the case of such shrinkage phenomena, the projections guarantee that the sealing effect achieved between the wire bundle surface and the inner circumference of the grommet is also maintained, by way of a "self-healing" process. The above-mentioned shrinkage processes may occur when a sealing means, used for filling cavities between adjacent wires of the wire bundle and for filling a space between the outer circumference of the wire bundle and the inner circumference of the grommet, disappears in the course of time. Such sealing means contain, for instance, butyl or other adhesive sealing materials. "Adhesive tapes" are known which make use of the adhesive and sealing effect of butyl, as described in DE 44 41 513 A1, the teachings of which are herein incorporated by reference.

Figure 10A:
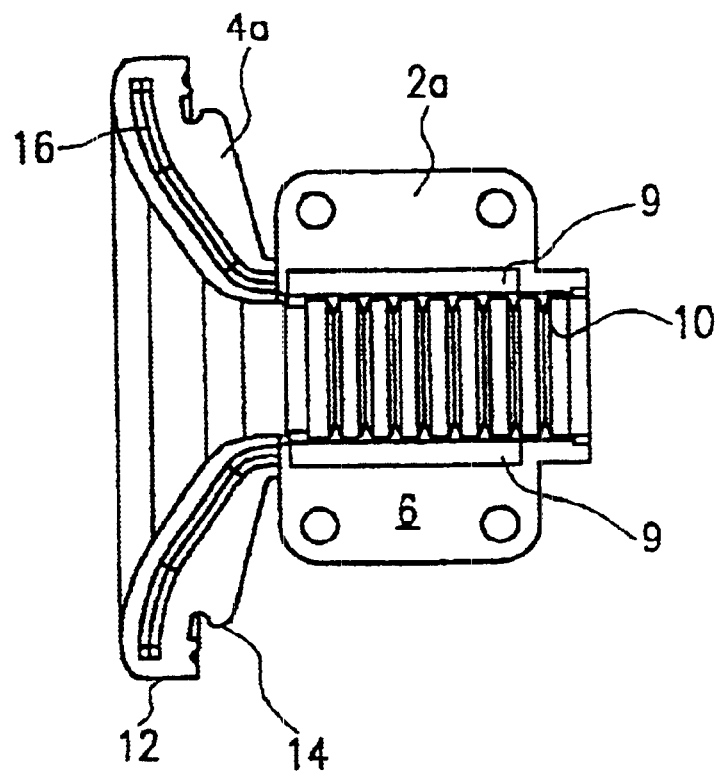
FIG. 10A is a top elevation view showing the inner surface of the upper grommet half of FIG. 9A.
Figure 10B:
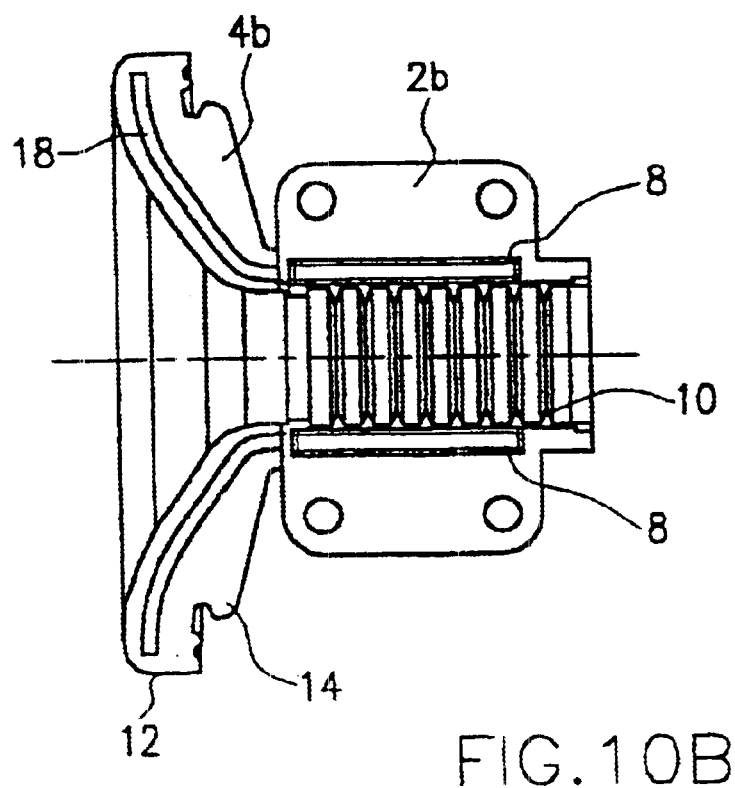
FIG. 10B is a top elevation view showing the inner surface of the lower grommet half of FIG. 9B.

FIGS. 10A and 10B are each a top view of the parts illustrated in FIGS. 9A and 9B in perspective. The press elements 2a and 2b, with the rib-like projections 10, are adjoined by connecting section elements 4a and 4b respectively. The connecting section is divided in the same plane as the press section, which comprises the press elements 2a and 2b. The connecting section has the shape of a funnel and a passage opening expanding in funnel-shaped fashion. This passage opening is aligned with the passage channel of the press section and, in the transitional area extending from the press section to the connecting section, the passage opening of the connecting section has the same inner diameter as the passage channel of the press member. The passage opening progressively expands as it extends further along the connecting section, away from the press section.

As already illustrated in FIG. 3, the connecting section elements 4a and 4b of all of the embodiments as described may have reinforcing portions, such as the reinforcing element 25, within their interiors. This reinforcing element 25 may be made integral with the press elements 2a and 2b, and may extend by a predetermined degree into the, connecting section element. The areas of the connecting section elements 4a and 4b, which are next to their respective press sections 2a and 2b, are given an enhanced strength by the reinforcing element 25, especially in the narrower funnel portion of the connecting section elements. In a preferred embodiment, the outer edge portion of the funnel-shaped connecting section 4 (FIG. 4) has a lower strength than the remaining grommet.

In FIGS. 10A and 10B, the outside of the resilient and flexible edge portion of the funnel-shaped connecting section elements 4a and 4b has a locking edge 12, which cooperates with a sealing lip 14, to provide a sealing means. When the grommet according to the invention is inserted into an opening of a partition wall, this sealing means sealingly surrounds an edge (not shown) of the wall with the locking edge 12 and sealing lip 14 elements.

A grommet in accordance with the present invention preferably consists of PA, at least in part. It is only the flexible resilient edge portion, with the sealing lip 14 and the locking edge 12, that consists of a softer material, such as EPDM or TPE, and extends around the reinforcing element 25 (FIG. 3). As already mentioned, the rib-like projections 10 which are provided in the passage channel formed by the two press elements 2a and 2b in their joined operative position consist of a resilient elastic material, such as rubber or silicone.

The divided grommet according to the invention is preferably used as described below. A cable bundle, such as the wire bundle shown in FIG. 8A, is inserted into one of the two grommet halves. If watertightness in the longitudinal direction in the area of the grommet is desired, adequate amounts of butyl or of another suitable sealing material are used to sealingly fill all spaces existing between the neighboring wires of the wire bundle, as well as all spaces existing between the outer circumference of the wire bundle and the inner circumference of the grommet in the area of the press elements 2a and 2b (FIG. 1A). In such a case, the passage opening is undersized in the area of the press elements 2a and 2b, relative to the wire or cable bundle comprising the sealing material. When the divided grommet is closed around the wire bundle and the flange elements 6 are tightened towards one another, a uniform pressure is exerted on the part of the wire bundle that is located inside the passage channel, whereby the sealing material is sealingly pressed into all hollow and intermediate spaces, and the wire bundle is thus made water-tight in longitudinal direction.

If longitudinal water-tightness in the above-described sense is not warranted, butyl or other sealing materials need not be utilized. If the outer diameter of a cable bundle is too small to ensure the required undersize with respect to the inner diameter of the passage channel, in the area of the press elements 2a and 2b, the wire bundle may be provided with the sheathing 50 in the desired area, shown in FIG. 8A. This section with sheathing 50, which provides an enlarged diameter, is then introduced into the one half of the divided grommet, whereupon the other half of the grommet is connected to the first half, thereby enclosing the wire bundle.

Thus, the grommet according to the invention makes it possible for a wire bundle to be lead through a wall opening, with the outer edge of the grommet sealingly enclosing the wall opening. If desired, the cable bundle may also be made water-tight in the area of the grommet in the longitudinal direction.

The rib-like projections.10, which are provided in the area of the passage channel of the press member 2a and 2b, ensure a slip-proof retainment of the wire bundle in the grommet, even with no sealing materials being provided between the wires of the wire bundle and/or between the outer circumference of the wire bundle and the grommet. The projections 10 also ensure a self-healing effect in wire bundle sections that are made water-tight in the longitudinal direction, if and when the outer diameter of the cable bundle decreases as a consequence of shrinkage phenomena in the sealing compound. In such a case, the elastic and flexible rib-like projections 10 compensate for shrinkage, resulting in a water tightness in the longitudinal direction that is ensured despite shrinkage.

Figure 11A:
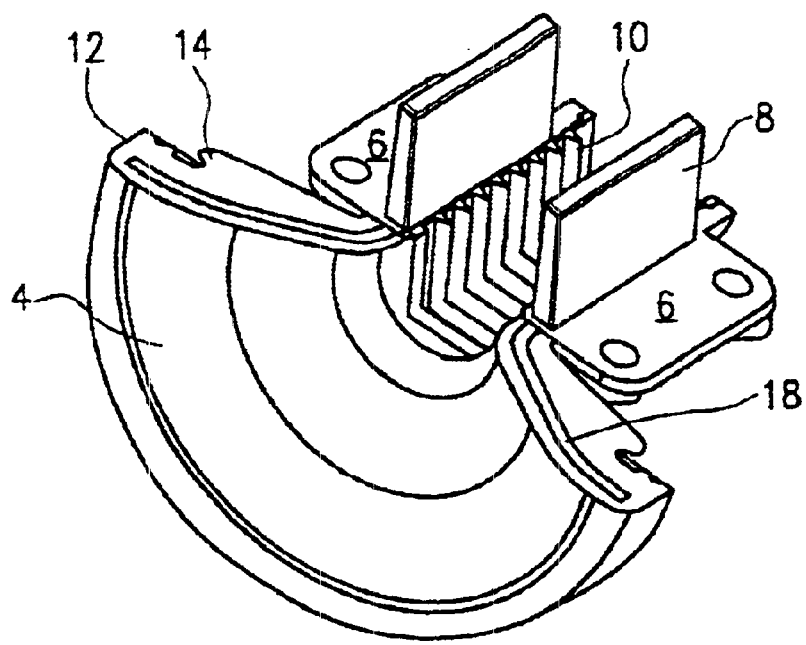
FIG. 11A is a perspective view of the lower grommet half of FIG. 9B, illustrating another embodiment of the passage opening of the grommet, in which it has a square or rectangular shape.
Figure 11B:
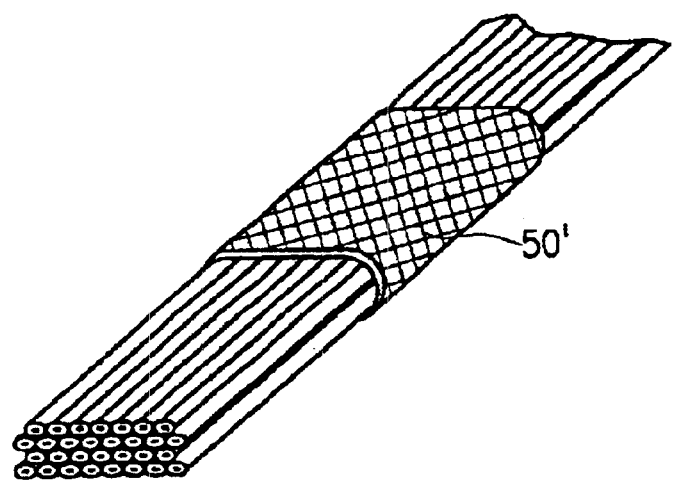
FIG. 11B is a perspective view of a flat cable bundle having a square or rectangular shape.
Figure 12:
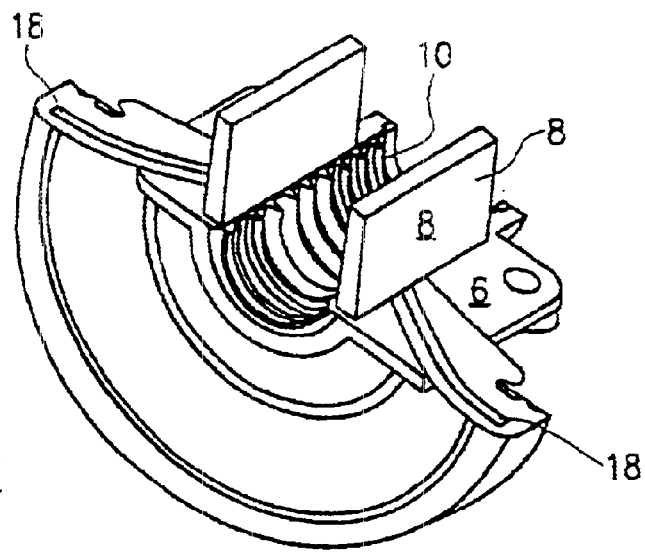
FIG. 12 is a perspective view of a grommet of the invention, illustrating receiving and sealing grooves, which are provided in the connection section element.

FIG. 11B shows a bundle of flat ribbon cables which are covered by a sheathing 50' which, as far as its purpose is concerned, is identical with the sheathing 50 shown in FIGS. 8A and 8B. While the cable bundle shown in FIGS. 8A and 8B has a substantially circular cross-section, the bundle of flat ribbon cables shown in FIG. 11B has a substantially square or rectangular cross-section. The part of an inventive grommet as is shown in FIG. 11A has a passage channel which has a square or rectangular design, and is thus adapted to the cross-sectional design of a wire bundle as shown in FIG. 11B. A passage channel with a square or rectangular design need not necessarily comprise the rib-like projections 10 as shown, but may have a smooth surface, as is shown in FIGS. 1 to 3, 5A and 5B. In its preferred embodiment, the grommet according to FIG. 11A is provided with a funnel-shaped connecting section element with reinforcing element 25 (FIG. 3), which preferably consists of PA. The outer member of this funnel-shaped connecting element consists, as described with reference to FIG. 3, of a more flexible material, preferably EPDM or TPE.

FIGS. 9 to 11A and 12 show that the grommet in the parting surfaces of its funnel-shaped connecting section 4 utilize a tongue-and-groove system so that the two halves of the connecting section 4 may be interconnected in fluid-tight fashion. To be more specific, these figures show either a projecting tongue 16 and a receiving groove 18 in each of the illustrated parting surfaces. A tongue-and-groove system is preferred in the parting surfaces of the connecting sections in all embodiments of the inventive grommet. The parting surfaces, including tongues 16 and grooves 18, consist of a soft plastic material, such as EPDM or TPE. If the connecting portions do not entirely consist of such a plastic material, the parting surfaces, including grooves and tongues, are coated with a flexible plastic material, e.g., EPDM or TPE. As an alternative to the above described tongue-and-groove system, full-area adhesive bonds may be used for the water-tight joining of the parting surfaces of the connection sections. Alternatively, the two parting surfaces may be coated with a sealing compound. The flange elements 6 may also be coated with a rubber-like material, such as EPDM or TPE, for obtaining a fluid-tight design.

Figure 13:
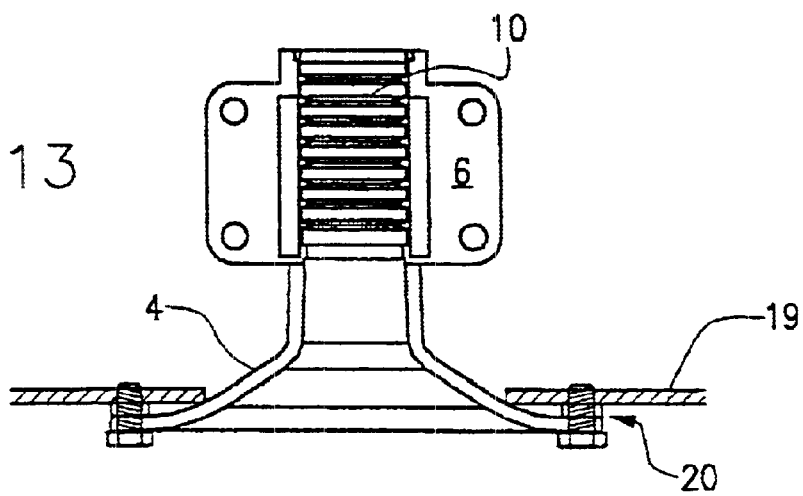
FIG. 13 is a top elevation view of another embodiment of the grommet of FIG. 12, illustrating the outer edge of the funnel-shaped connecting section being provided with thread means to permit a screwed connection with a wall area.

The design of the outer circumference of the funnel-shaped connecting section 4 with locking edge 12 and sealing lip 14, discussed in the above-described embodiments of the inventive grommet, may be replaced by any other suitable design. For instance, FIG. 13 shows a grommet which is divided according to the invention, where the funnel-shaped connecting section 4 is screwed to a body sheet 19 in the area of its circumference. To this end, suitable screw means are provided in the circumferential area of the connecting section 4. FIG. 13 further shows a sealing ring 20 which is integrated into the funnel-shaped connecting section 4. All of the known embodiments of draw-in, push-in or press-in grommets may in principle be produced as divided types, provided the design is suited therefore. The funnel portion may also have any desired shape.

Figure 14:
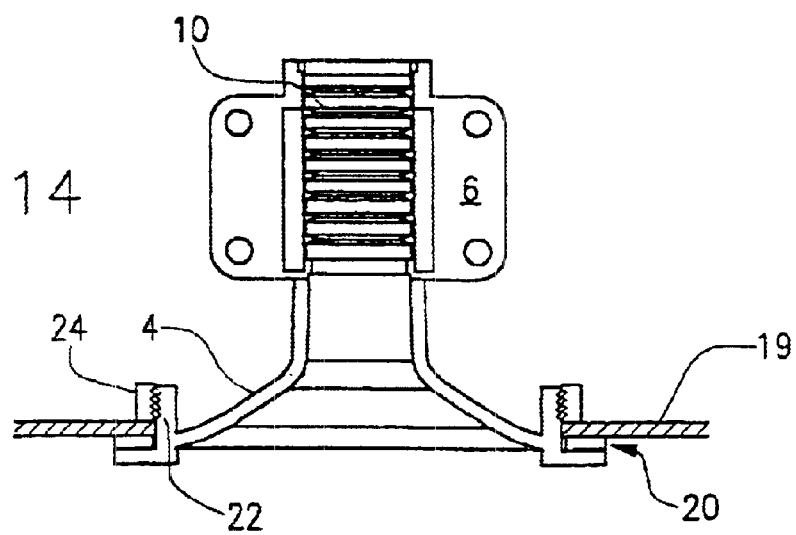
FIG. 14 is a top elevation view of another embodiment of the grommet of FIG. 12, illustrating a dividable ring on the outer edge of the funnel-shaped connecting section, the ring being adapted to be screwed onto an external thread located on the outermost lower circumference of the funnel-shaped connecting section.

FIG. 14 shows a design of the outer circumference of the funnel-shaped connecting section 4 with an external thread 22 which is formed on the outermost lower circumference of the funnel-shaped connecting section 4. An internal thread which is provided on a dividable ring 24 may be screwed to this external thread 22 to retain a body sheet 19 disposed therebetween. As may also be gathered from FIG. 14, a sealing ring 20 is provided which is integrated into the funnel-shaped connecting section 4 to ensure a water-tight connection of the grommet to a wall.

FIGS. 15 to 17B show a grommet which is divided according to the invention and which differs from the previously described embodiments substantially by the feature that the connecting section 4 is not funnel-shaped. In the embodiment shown in FIGS. 15 to 17B, the connecting section 4 follows the press section in the longitudinal direction, i.e. axially.

Figure 15:
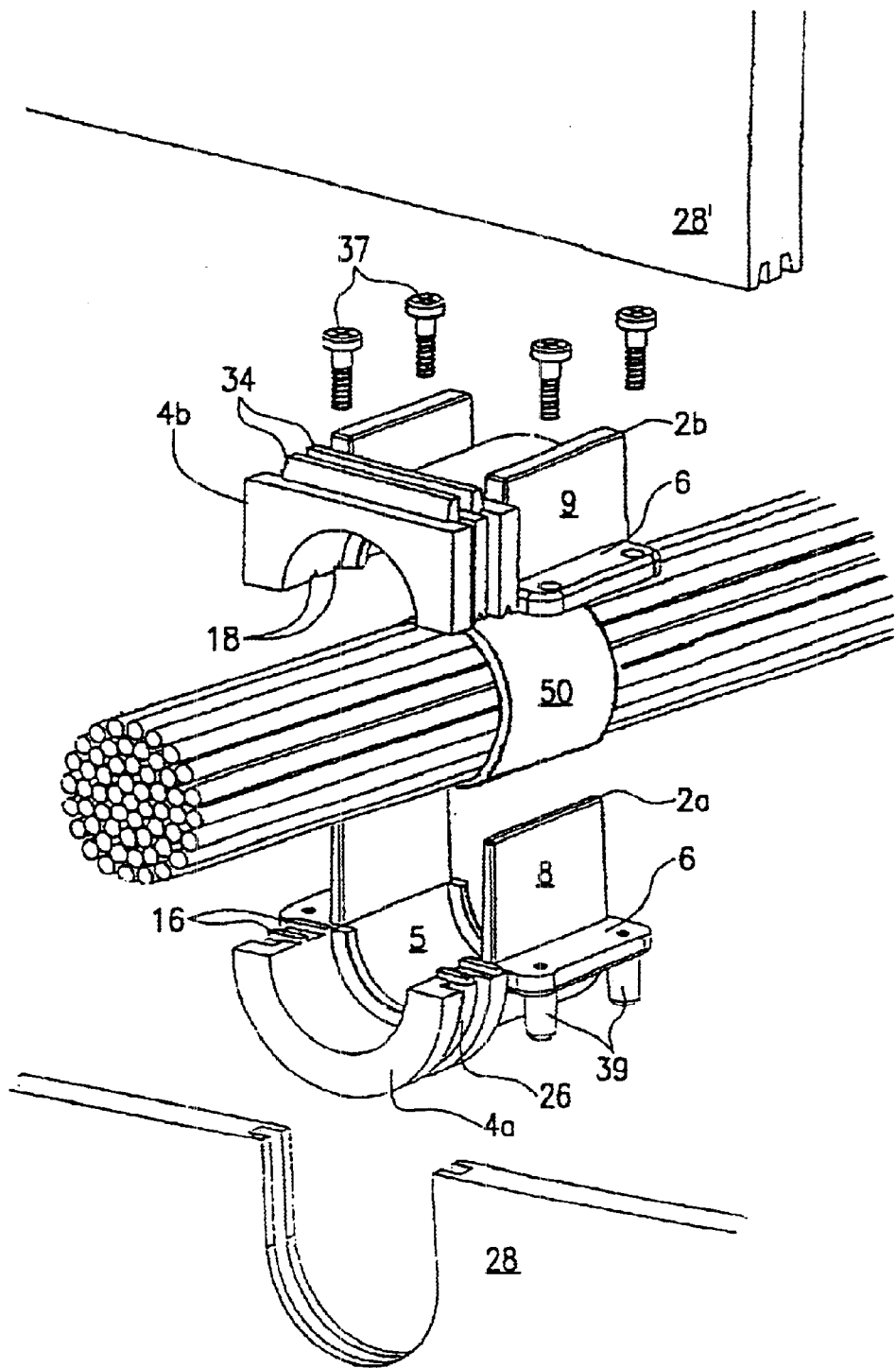
FIG. 15 is a perspective view of another grommet embodiment, in contrast with the grommet embodiment of FIG. 1A, with a connecting section that is not funnel-shaped, allowing positive connection to a wall section.

The embodiment of the divided grommet of the invention as shown in FIG. 15 differs from the grommet embodiment shown in FIG. 1A, primarily due to the design difference of the connecting section 4. In both embodiments, the connection section 4 consists of an upper part 4b and a lower part 4a. Although not shown in FIG. 15, the connecting section elements 4a and 4b of the embodiment, according to FIGS. 15 to 17B, consist of a hybrid material, namely a stiffening material or "skeleton", which corresponds to the reinforcing material 25 (FIG. 3), and an elastic non-rigid material, such as EPDM or TPE, which surrounds said stiffening material. Like the embodiments of the inventive grommet which are provided with the funnel-shaped connecting section, the connecting sections 4a and 4b of the embodiment shown in FIG. 15 are provided in their parting surfaces with a tongue-and-groove system. As a consequence of the above-described structure consisting of an inner rigid material, preferably PA, and an outer softer material, preferably EPDM or TPE, used in combination with the above-described tongue-and-groove system, it has been possible to ensure dimensional stability and tightness in the area of the parting planes.

The absence of dimensional stability in the area of the parting surfaces would lead to the formation of small passage openings between the parting surfaces upon the action of external forces, which would result in leakage.

In contrast to the above-described embodiments, the embodiment according to FIGS. 15 to 17B is not intended to be sealingly pulled into a board wall, but is intended to be sealingly slid into a wall. Such a wall is schematically designated in FIG. 15 by reference numeral 28, in reference to the bottom portion, and reference numeral 28', in reference to the top portion. As may be gathered from FIG. 15, the lower part of the connecting section 4a includes a profiled portion 26 which positively cooperates with a profiled portion formed in the lower wall 28 to form seal. The upper part of the connecting section 4b is provided with sealing strips 34 whose design positively cooperates with a corresponding design in the lower edge of the upper wall section 28' to form a seal. In the operative position, the joined connecting section elements 4a and 4b are sealingly connected to the wall 28 and 28', so that the wire bundle illustrated in FIG. 15 sealingly passes through wall 28 and 28'.

As already described with reference to the preceding embodiments, press elements 2a and 2b axially, or longitudinally, follow the connecting section elements 4a and 4b, respectively. As described with reference to the preceding embodiments, the press elements consist at least in the area of the flange elements 6 of a sufficiently rigid material, such as PA. Advantageously, the press elements and the stiffened portions for the connecting section elements 4a and 4b are made integral in all of the embodiments of the inventive grommet.

Figure 16A:
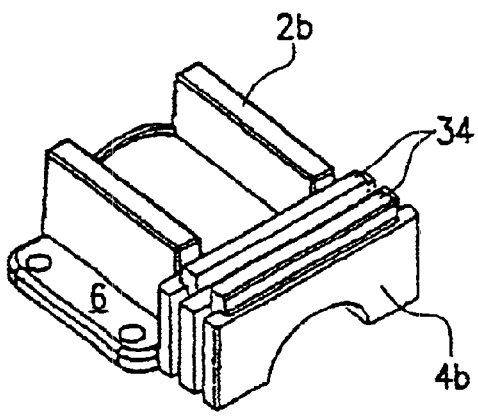
FIGS. 16A and 16B are perspective views from different viewing angles of the upper half shell of the grommet illustrated in FIG. 15.
Figure 16B:
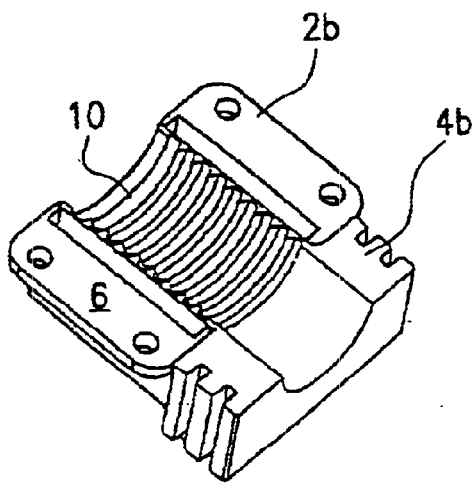

FIGS. 16A and 16B show various perspective views of an upper half shell of FIG. 15 each with press element 2b and connecting section element 4b, and with sealing strips 34, as described with reference to FIG. 15. FIG. 16B shows that the press element section 2b, consisting of a rigid material, is provided with a rubber-like inner lining in which rib-like projections 10 are formed, as described and shown above with reference to FIGS. 9 to 11A and 12.

Figure 17A:
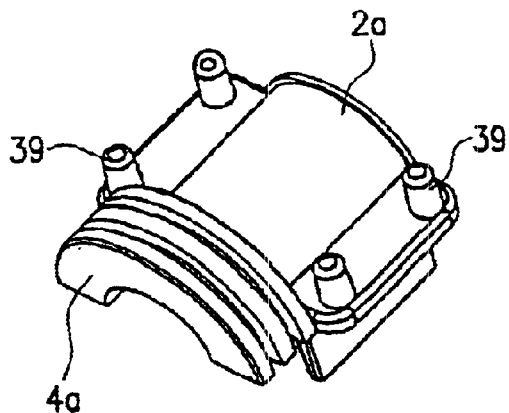
FIGS. 17A and 17B are perspective views from different viewing angles of the lower half shell of the grommet shown in FIG. 15.
Figure 17B:
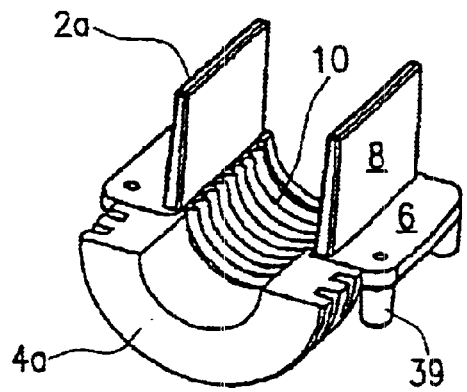

In FIGS. 17A and 17B, the lower half shell according to FIG. 15 is shown in various perspective views. As may be gathered from FIG. 17B, the press section of the lower half shell is also provided with an inner rubber-like lining which may comprise the already described rib-like projections 10.

It should be noted that the tongue-and-groove configuration provided in the parting surfaces of the connecting section elements 4a and 4b are not shown in FIGS. 16 to 17.

Screws 37, which may be screwed through drilled holes formed in the flange elements 6 into screw receiving means 39, which are shown in FIGS. 15 and 17, are provided in FIG. 15, for joining the upper half shell and the lower half shell.

The wire bundle which is shown in FIG. 15 is provided with a sheathing 50 which has already been described above with reference to FIG. 8A. Such a sheathing 50 is expediently provided when the diameter of the wire bundle does not have the necessary oversize with respect to the diameter of the passage channel 5. It may be ensured, with the help of a sheathing 50, that the wire bundle is held with a press fit between the press elements 2a and 2b, when the two half shells forming the grommet, according to the invention, are interconnected in their operative position.

In the embodiment according to FIGS. 15 through 17, the connecting section 4 may predominantly consist of a preferably rigid material, where it is only necessary that the profiled portion, i.e. the lamellae, be coated with a softer or more flexible plastic material to ensure the desired dimensionally stable sealing :.functionality in the area of the parting surfaces. As an alternative, the edge portion of the>passage may also be provided with a flexible resilient bead, whereby the connecting section 4, including the profiled portion or contour, is made of a preferably rigid plastic material.

In some cases, it may be advantageous for the free end of the press section of all of the above-described embodiments, i.e. the end opposite the connecting section, to have a holding or coupling elements mounted thereon. With holding or coupling elements, such as undercuts, the foldable coupling members of conventional corrugated protective tubes may be coupled with the grommet of the invention. Such coupling elements are illustrated in FIGS. 1 to 3 by reference numerals 30.

Figure 18:
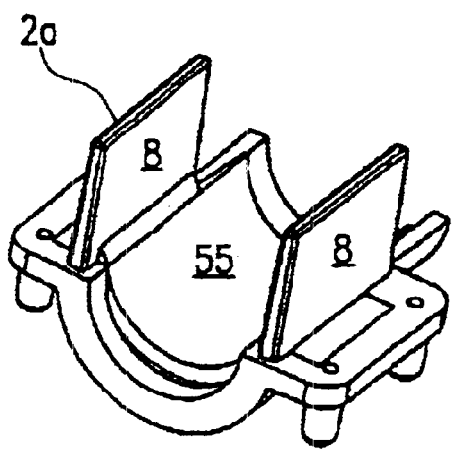
FIG. 18 is a perspective view of a press element in which the wall defining the passage channel consists of a flexible or semiflexible material.

FIG. 18 only shows a press element 2a of a lower half shell of the inventive grommet, where the press element 2a is combinable with any of the above-described connecting section elements 4a to form a complete lower half shell. In the press element shown in FIG. 18, the curved section 55, or flex section, of the passage channel, which is formed between the two guide tongues 8, consists of a flexible or semiflexible, rubber-like material, such as EPDM or TPE. In the illustrated embodiment, this rubber-like material is held in the opposite areas designated by 56, with the rubber-like material extending between these areas in the manner of a hammock, as illustrated by the drawn curvature. The parts of the illustrated press element 2a that differ from the "hammock" type section 55 consist of a rigid material, such as PA. The grommet according to the invention may be a press element with a flexible or semiflexible section 55 (a flex section) in each of its two half shells or in only one of its half shells.

The design of at least one of the press elements with the "hammock" type section 55, as is shown in FIG. 18, makes it possible to adapt the passage channel diameter to the diameter of the wire bundle received in the passage channel, in particular when the wire bundle has a certain oversize. As is described with reference to FIG. 8, an oversize of the wire bundle diameter relative to the diameter of the passage channel must always be sought to exert the desired pressure on the wire bundle received in the passage channel.

As already described, in all embodiments, if water tightness inside the wire bundle is not necessary in the longitudinal direction, the desired oversize may be achieved with the help of sheathings 50 and 50', illustrated in FIGS. 8A and 11B respectively, or by the fillers described in the prior art, DE 196 40 816 A1. By contrast, if water tightness inside the wire bundle is required in the longitudinal direction, an oversize will be obtained almost automatically through the use of a sealing compound, such as butyl, which is incorporated between the wires of the wire bundle and increases the circumference of the wire bundle accordingly.

In the embodiment according to FIG. 18, the "hammock" type section exerts a constant pressure on the wire bundle provided in the passage channel, whereby the pressure exerted on the wire bundle is maintained in cases where the sealing compound might shrink. Thus, the flexible or semiflexible, rubber-like material of flex section 55 has a continuous effect on the sealing compound, resulting in a "self healing effect" in cases where the sealing compound disappears. The embodiments according to FIGS. 9 to 14 and 16B and 17B differ from this embodiment of FIG. 18 because they consist of a solid, rigid material, such as PA, in which there is only an inner lining of a flexible material, such as rubber, silicone, or the like, of which the illustrated rib-like projections 10 consist.

For the sake of clarity, it should be rioted that in all of the embodiments of the inventive grommet which are illustrated and described in this application, "passage channel" always means the tubular space which is provided for receiving a wire bundle and which is obtained between two press elements, which are interconnected as intended.

Furthermore, for the sake of clarity it should be noted that within the scope of the present application, "half shell" means a structure respectively comprising a press element and a connecting section element, the structure being adapted to be united with a second half shell to form a grommet, which is divided according to the invention.

Figure 19:
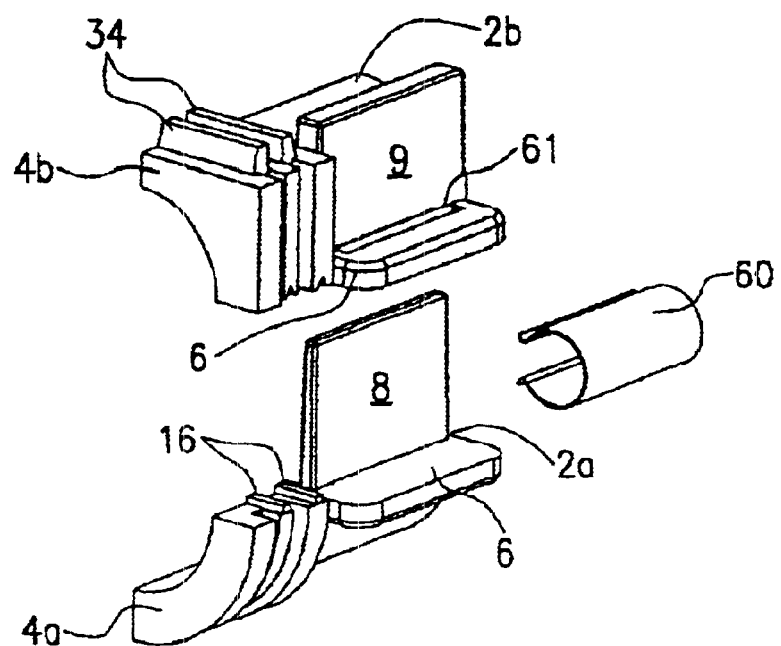
FIG. 19 is a partial view of an upper half shell and a lower half shell, showing a spring clip with the aid of which the two half shells are interconnectable.

For joining the two half shells, screw connections (FIGS. 1 to 3 and 15 to 17), locking connections (FIGS. 5 to 7) and the like have already been described above. FIG. 19 illustrates a design which is advantageous with respect to the above-described shrinkage of a sealing compound that is provided in the wire bundle. FIG. 19 schematically shows a partial view of the press elements 2a and 2b and connecting section elements 4a and 4b of the upper and lower half shells of the arrangement illustrated in FIG. 15. For instance, there are also shown the sealing strips 34 and the tongues 16. In FIG. 19, a spring clip 60 is shown which serves to firmly interconnect the upper half shell and the lower half shell in the operative position. When in the operative position, the flange elements 6 of the upper half shell and of the lower half shell respectively, are placed one upon the other. The spring clip 60 grips around the pair of flange elements 6 put one upon the other, with the one clamping strip of the spring clip 60 acting on the backside of one flange element 6 and the other clamping strip of the spring clip 60 acting on the backside of the other flange element 6. In the illustrated embodiment, longitudinal grooves 61, of which FIG. 19 shows such a groove 61 in the upper flange element 6a, are provided in the flange elements 6. If the wire bundle diameter shrinks during the service life of an inventive grommet, the advantageous pressure exerted on the wire bundle cross section is maintained as a consequence of the spring force of the spring clip 60 and ,he desired self-healing effect is ensured or at least supported in this manner.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. A dividable grommet-for achieving a fluid-tight blocking section within and around a wire bundle (wire harness), the dividable grommet comprising:
   an upper press element and an upper connecting section element, the upper press element being connected to the upper connecting section element to form an upper half shell;
   a lower press element and a lower connecting section element, the lower press element being connected to the lower connecting section element to form a lower half shell;
   the upper half shell being coupleable to the lower half shell via coupling of the upper press element to the lower press element and the upper connecting section element to the lower connecting section element, the coupling of the upper connecting section element and the lower connecting section element creating a sealing effect therebetween;
   the upper press element and the lower press element being coupleable in a fluid-tight fashion, the coupling of the upper press element and the lower press element forming a tubular passage channel for receiving the wire bundle;
   the upper connecting section element and the lower connecting section element being connectible in a fluid-tight fashion to an edge of a wall opening;
   each of the upper press element and the lower press element further including two opposed flange elements, wherein the flange elements of the upper half shell and the flange elements of the lower half shell may be positively fixed together, the flange elements having a dimension in a longitudinal direction;
   wherein the press element of one of the half shells includes guide tongues and the press element of the other half shell includes receiving pockets for receiving the guide tongues, the guide tongues and receiving pockets having a dimension in the longitudinal direction approximate the dimension of the flange elements in the longitudinal direction, the guide tongues forming filling level indicators suitable for monitoring a diameter of the wire bundle; and
   wherein at least one of the upper press element or the lower press element includes a flex section forming an elastic portion of the tubular passage channel.

2. The grommet of claim 1, wherein the grommet is configured for receiving an elongated object that is multiple sheathed wires.

3. The grommet of claim 1, wherein the grommet is configured for receiving an elongated object that is a bundle of multiple flat ribbons.

4. The grommet of claim 1, wherein the grommet is configured for receiving an elongated object that is a bundle of flat cables.

5. The grommet of claim 1, wherein the tipper connecting section element and the lower connecting section element are configured such that they are dimensionally stable.

6. The device of claim 1, wherein the upper press element is connected to the upper connecting section element at an upper adjoining area and the lower press element is connected to the lower connecting section element at a lower adjoining area, the upper adjoining area and the lower adjoining area comprising a stiffened portions.

7. The device of claim 6, wherein the stiffened portion further comprises a rigid material surrounded by an elastic material.

8. The device of claim 1, wherein the connection of the upper connecting section element and the lower connecting section element further includes a tongue-and-groove systems.

9. The device of claim 1, wherein the flange elements of the upper half shell and the flange elements of the lower half shell may be positively fixed together with at least one screw.

10. The device of claim 1, wherein the flange elements of the upper half shell and the flange elements of the lower half shell may be positively fixed together with a lock.

11. The device of claim 1, wherein the flange elements of the upper half shell and the flange elements of the lower half shell may be positively fixed together with glue.

12. The device of claim 1, and further including spring clips, the spring clips being configured to load the upper press element towards the lower press element and to connect the flange elements of the upper half shell and the lower half shell.

13. The device of claim 1 wherein the tubular passage channel formed by the connection of the upper press element and the lower press element has a diameter smaller than a diameter of the elongated object.

14. The device of claim 1 wherein a flexible or semiflexible material is provided along at least a part of a wall of the passage channel formed by the connection of the upper press element and the lower press element.

15. The device of claim 13 where the flexible or semi-flexible material is EPDM/TPE.

16. The grommet of claim 1, wherein the flex section is formed of a flexible material.

17. The grommet of claim 1, wherein the flex section is formed of a semi-flexible material.

18. The grommet of claim 1, wherein the upper connecting section element, in an area adjoining the upper press element, and the lower connecting section element, in an area adjoining the lower press element, comprises a stiffened portion consisting of a rigid material, the rigid material being surrounded .by an elastic material, wherein the upper connecting section element and the lower connecting section element are coupleable via a tongue-and-groove system.

19. The grommet of claim 18, wherein the rigid material is polyamide.

20. The grommet of claim 18, wherein the elastic material is EPDM/TPE.

* * * * *